Feb. 18, 1930.    A. R. HUETTIG    1,747,439
TANK GAUGE
Filed Dec. 5, 1928
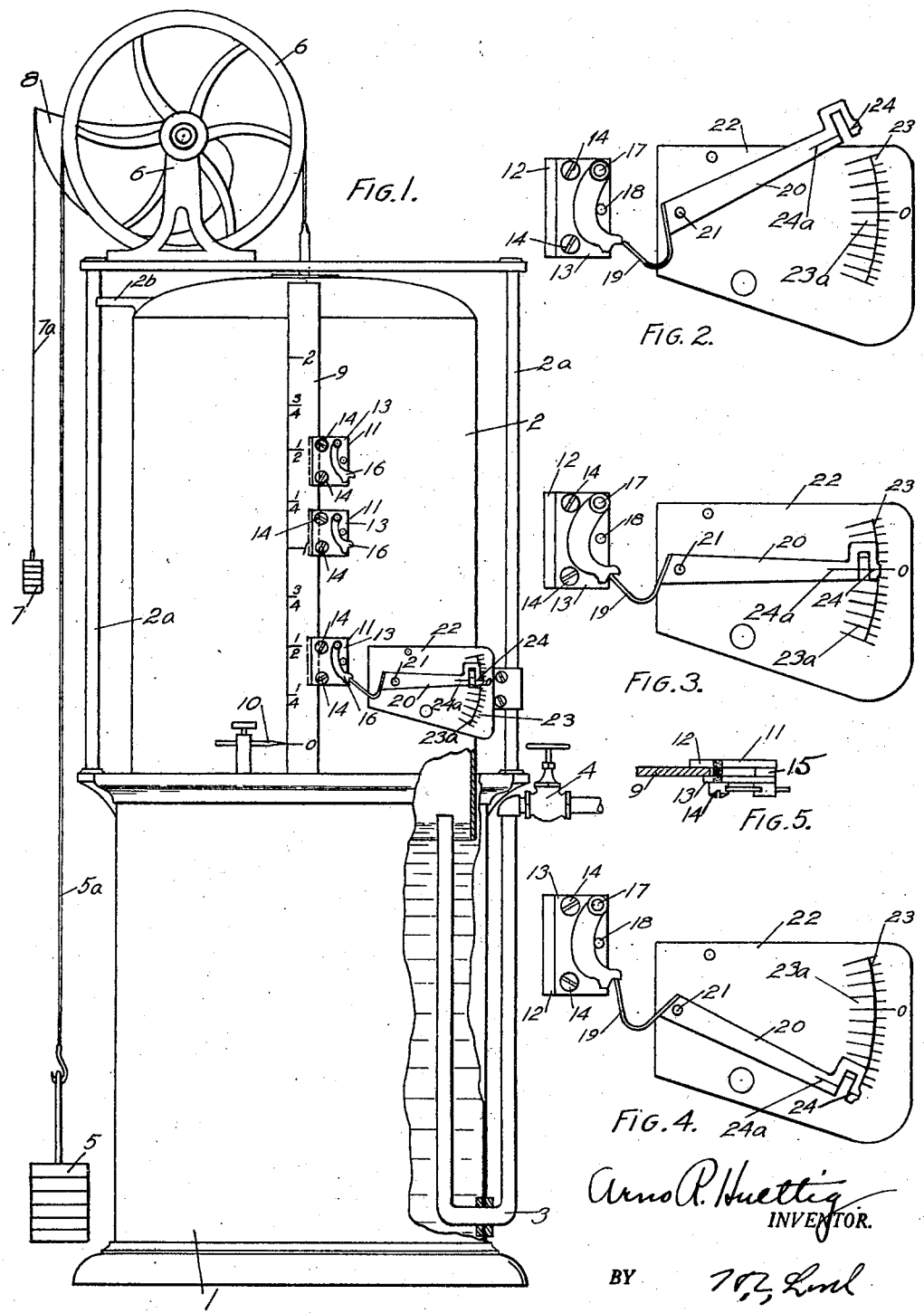

Patented Feb. 18, 1930

1,747,439

UNITED STATES PATENT OFFICE

ARNO R. HUETTIG, OF ERIE, PENNSYLVANIA, ASSIGNOR TO AMERICAN METER COMPANY, OF NEW YORK, N. Y., A CORPORATION OF DELAWARE

TANK GAUGE

Application filed December 5, 1928. Serial No. 323,855.

The gauge forming the subject matter of this invention is particularly designed for a meter prover. With such devices accurate reading is very desirable and the ordinary movement of the bell does not give such fine reading as to facilitate such accuracy. The object of the present invention is to provide such devices with a "fine-reader" having a reading movement very much in excess of the movement of the bell. Features and details of the invention will appear from the specification and claims.

A preferred embodiment of the invention is illustrated in the accompanying drawings as follows:—

Fig. 1 shows a front elevation of the apparatus, partly in section.

Figs. 2, 3 and 4, show the indicating mechanism in different relations.

Fig. 5 a plan view of the actuator.

1 marks the liquid tank, and 2 the bell which is movably mounted in a frame 2ª, the bell being provided with the guiding brackets 2ᵇ. A pipe 3 leads from the bell and is controlled by a valve 4. A counterweight 5 is connected by a cable 5ª with the bell passing over a pulley 6. The pulley 6 is carried by a bracket 6ª mounted on the frame 2ª. A compensating weight 7 is carried by a cable 7ª and supported by a cam 8. A scale plate 9 is fixed on the bell and operates in relation to a pointer 10. The parts so far as described relate to a structure known as a meter prover in common use.

An actuator 11 is adjustably secured on the plate 9. This actuator comprises a base 12, a clamping plate 13, and screws 14 extending through the clamping plate 13 into the base 11. The base 11 is placed under the scale plate 9 and the actuator is clamped in place on the scale plate by means of the screws 14. The front edges of the plates 12 and 13 are spaced by spacing washers 15.

A pawl 16 is pivotally mounted on a pin 17 and swings between the screws 14 as stops and a stop pin 18 on the plate 13.

The pawl engages a contact plate 19 on an indicating finger 20. The indicating finger 20 is pivoted through a pin 21 on a plate 22. The plate 22 is provided with a scale 23 and the finger has a reading line 24.

With the actuator in place on the scale, as the bell descends with the discharge of air, or gas, the pawl 16 engages the plate 19 in the manner shown in Fig. 4, the pawl 16 being weighted to rest normally against the stop 18. As the bell descends the indicating finger traverses the scale 23 and the adjustment of the actuator on the scale plate should be such that the indicating finger will reach the zero reading at the proper position. As the bell descends the finger is swung until the plate 19 clears the pawl 16, as shown in Fig. 2.

A plurality of actuators are placed on the scale plate 9, the lower actuator being used for the zero position of the bell. In practice, the bell is lifted by introducing air through the pipe 3 above the position shown in Fig. 1 and then gradually worked down until the indicating finger is at zero. An actuator is placed above this a sufficient distance to give the desired volume of gas discharged to make a quick reading and as this actuator engages the indicating finger and moves it to zero the bell is checked and the reading taken. If a more extended test is desired, a third actuator may be placed on the scale making the discharge volume greater in taking the final reading.

It will be seen, therefore, that the actuator and finger have the form of an escapement permitting the movement of the actuator past the indicating finger in both directions. Thus the device performs without attention of the operator both in the setting of the bell and the measuring discharge.

Where a plurality of actuators are used so as to make a more extended test it is desirable to provide a scale having a percentage reading relatively to the volume of gas involved in depressing the bell to each of the actuators. To that end, a supplemental scale 23ª of coarser reading than 23 is preferably provided and the finger has a separate reading mark 24ª operating over the scale 23ª. This wider reading in the scale 23ª gives for greater accuracy where this is desired, the same percentage of variation being indicated in the scale 23ᵃ for its larger quantity as with the percentage in the scale 23 operating with relation to the smaller quantity.

What I claim as new is:—

1. In a tank gauge, the combination of a movable tank bell; an actuator movable with the bell; and a pivotally mounted indicating finger in the path of and actuated by the actuator, said finger being disconnected from the actuator during a portion of its movement, said finger having a greater indicating movement than the bell.

2. In a tank gauge, the combination of a movable tank bell; an actuator movable with the bell; and an indicating finger in the path of and actuated by the actuator, the actuator and finger being formed with an escapement permitting the movement of the actuator past the finger.

3. In a tank gauge, the combination of a movable tank bell; an actuator movable with the bell; and an indicating finger in the path of and actuated by the actuator, the actuator and finger being formed with an escapement permitting the movement of the actuator past the finger in both directions.

4. In a tank gauge, the combination of a movable tank bell; an actuator secured movable with the bell comprising a pivoted pawl; and a pivoted indicating finger in the path of the pawl, the pawl swinging to permit the escapement of the finger with a movement of the bell in one direction and the swinging of the finger permitting the escape of the pawl with a movement of the bell in the opposite direction.

5. In a tank gauge, the combination of a movable tank bell; a scale plate on the bell; an actuator adjustably mounted on the bell; and a pivotally mounted indicating finger in the path of and actuated by the actuator, said finger having a greater indicating movement than the bell.

6. In a tank gauge, the combination of a movable tank bell; a scale plate on the bell; an actuator support comprising clamping plates adjustably secured on the scale plate; a pawl on the actuator support; and an indicating finger in the path of the pawl.

7. In a tank gauge, the combination of a movable tank bell; a plurality of actuators movable with the bell; and a pivotally mounted indicating finger in the path of and actuated by said actuators, said finger having a greater indicating movement than the bell.

8. In a tank gauge, the combination of a movable tank bell; a plurality of actuators movable with the bell; and an indicating finger in the path of and actuated by the actuators, the actuators and finger being formed with escapements permitting the movement of the actuators past the finger.

9. In a tank gauge, the combination of a movable tank bell; a plurality of actuators movable with the bell; and an indicating finger in the path of and actuated by the actuators, the actuators and finger being formed with escapements permitting the movement of the actuators past the finger in both directions.

10. In a tank gauge, the combination of a movable tank bell; a plurality of actuators secured movable with the bell comprising pivoted pawls; and a pivoted indicating finger in the path of the pawls, the pawls swinging to permit the escape of the finger with a movement of the bell in one direction and the swinging of the finger permitting the escape of the pawl with a movement of the bell in the opposite direction.

11. In a tank gauge, the combination of a movable tank bell; a scale plate on the tank bell; a plurality of actuators adjustably secured on the scale plate; and a pivotally mounted indicating finger in the path of and actuated by the actuators, said finger having a greater indicating movement than the movement of the bell.

12. In a tank gauge, the combination of a movable tank bell; a scale plate on the tank bell; a plurality of actuators adjustably secured on the scale plate; a pivotally mounted indicating finger in the path of and actuated by the actuators, said finger having a greater indicating movement than the movement of the bell; a scale over which the finger operates having different spaced markings in relation to the quantity of gas excluded with the operation of each actuator; and means on the finger reading on each scale.

In testimony whereof I have hereunto set my hand.

ARNO R. HUETTIG.